J. W. MURPHY.
Packings for Hydrants, Pumps, &c.
No. 142,264.    Patented August 26, 1873.
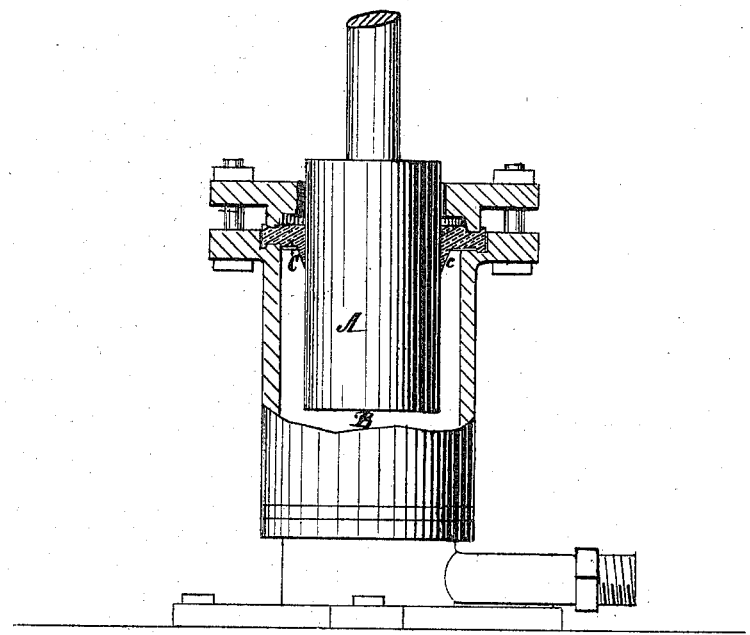
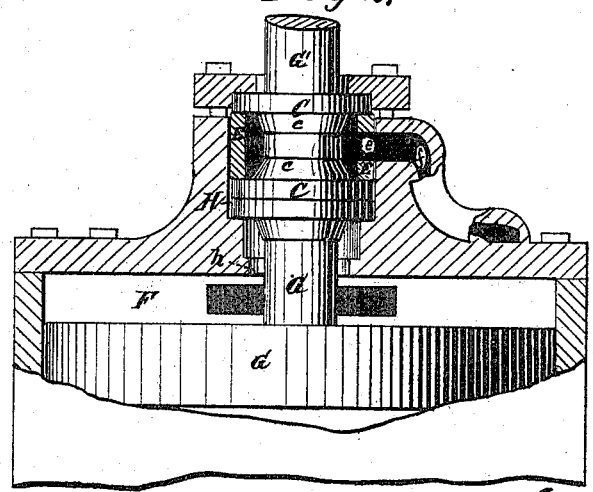
Witnesses:
G. Mathys
Solon C. Kemon
Inventor:
John W. Murphy
Per _____
Attorneys.

UNITED STATES PATENT OFFICE.

JOHN W. MURPHY, OF BALTIMORE, MARYLAND.

IMPROVEMENT IN PACKINGS FOR HYDRANTS, PUMPS, &c.

Specification forming part of Letters Patent No. 142,264, dated August 26, 1873; application filed June 3, 1873.

*To all whom it may concern:*

Be it known that I, JOHN W. MURPHY, of the city of Baltimore and State of Maryland, have invented a new and Improved Packing for Hydrants, Pumps, &c.; and I do hereby declare the following to be a full, clear, and exact description of the same, reference being had to the accompanying drawing forming a part of this specification, in which—

Figure 1 is a sectional elevation of a hydrant to which my invention is applied, and Fig. 2 is a similar elevation of a fragment of a double-acting pump.

The invention consists in a peculiar form of packing for pistons or other reciprocating rods, as hereinafter specified and pointed out in the claim.

In the drawing, A represents a hydrant-plunger, and B the cylinder in which it moves, while C is my improved packing, made of rubber, and provided with the downwardly-projecting flange $c$. The latter is cylindrical on the inside to correspond with the aperture of the main body of the packing, and with the circularity of the plunger A, but conical on the outside face. The effect of the construction of the packing is that as the piston ascends, creating a vacuum behind it, the water presses against the outer conical surface of the flange $c$, and packs its inner surface closely against the piston-rod; but when the piston is descending with its valve open no such close packing is required, and no such effect is produced. This packing may be used double or treble for some purposes.

In Fig. 2 of drawing, C C represent two of my packing-rings placed with their solid rings face to face, while above them is a third one, with its flange projecting downwardly. Between the two outer rings C is an annular ring, E, which spaces and holds them apart. F is the cylinder, on which works piston G, and H the packing-chamber. In this case the object is to pack the piston-rod G' during both the up and down strokes. In order to accomplish this with a double-acting pump the piston G moves up and causes the water to flow through hole $h$ into chamber H, when the flange of the inner packing-ring is made to hug the rods G' tightly. On the other hand, when piston G moves in the opposite direction the water in front of the piston is admitted by a pipe, $f$, and a hole, $e$, against the flanges of the oppositely-placed rings, or against that of one of them. This has the same effect as before, of compressing the flange or flanges of my packing closely about the piston-rod G'.

I am aware that the use of fluids for packing, and of rubber rings for that purpose, are old and well known to the public; but What I do claim, and desire to secure by Letters Patent, is—

The packing-ring C, cylindrical on the inside, and having a flange, $c$, tapering on the outside, as and for the purpose described.

JOHN W. MURPHY.

Witnesses:
   L. C. HEATH,
   ALBERT SHARE.